Aug. 15, 1950  J. McCRINK  2,519,269
SAW GUIDE WITH ADJUSTABLE WORK CLAMP
Filed Nov. 3, 1947  3 Sheets-Sheet 1

Joseph McCrink
INVENTOR.

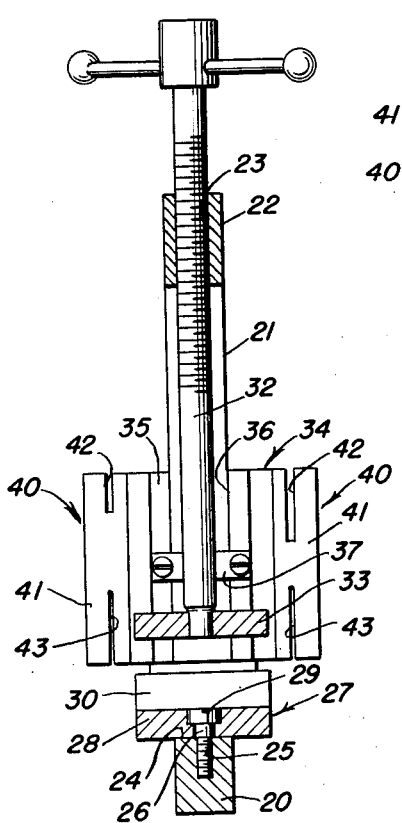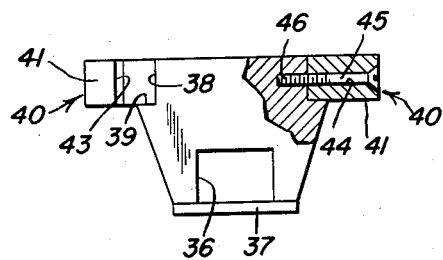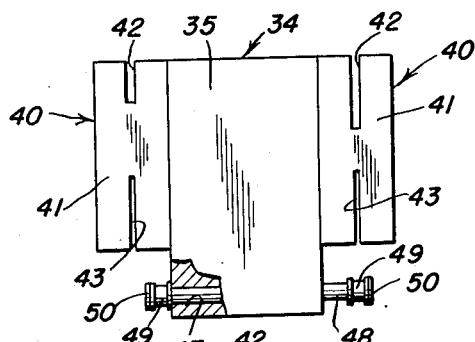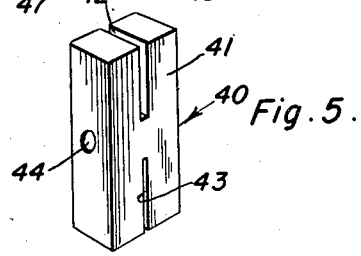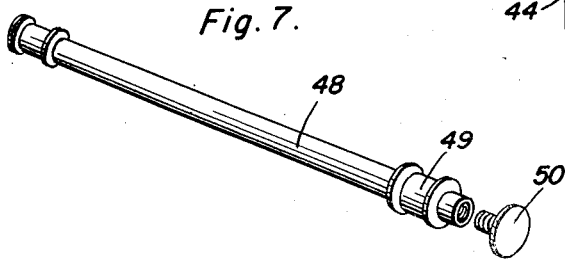

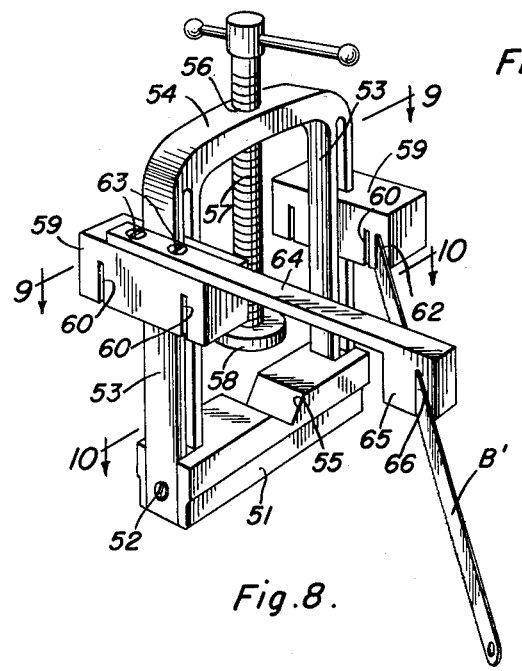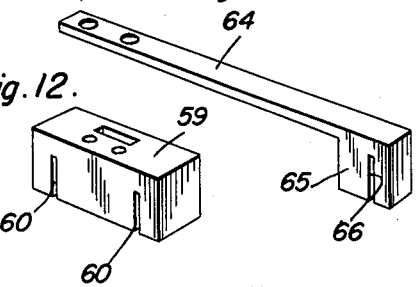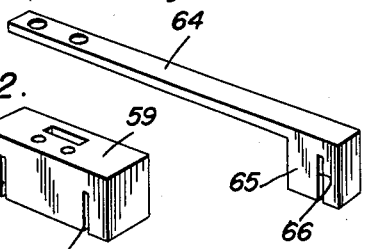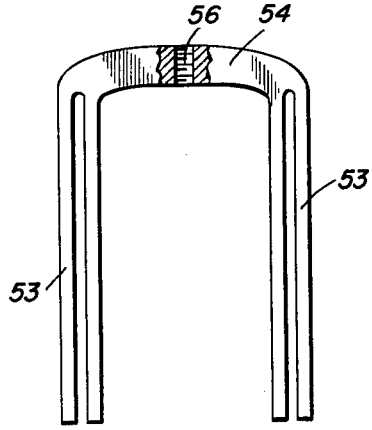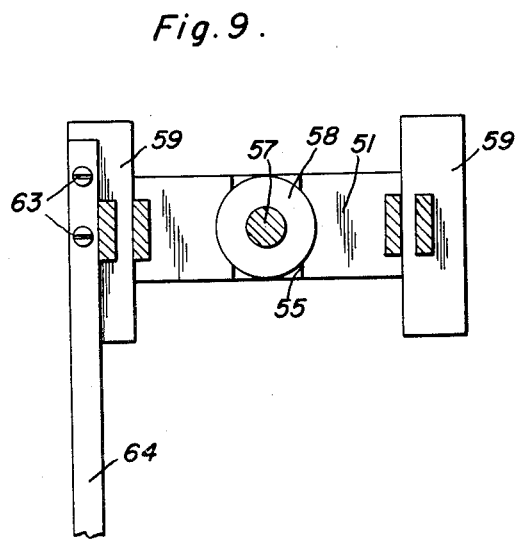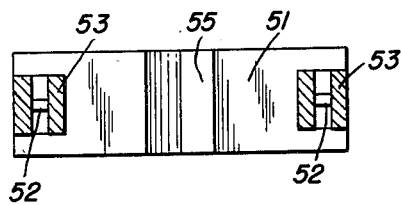

Patented Aug. 15, 1950

2,519,269

UNITED STATES PATENT OFFICE 2,519,269

SAW GUIDE WITH ADJUSTABLE WORK CLAMP

Joseph McCrink, West Orange, N. J.

Application November 3, 1947, Serial No. 783,641

5 Claims. (Cl. 143—90)

This invention relates to a saw guide and feeding device and has for its primary object to guide a saw blade while the latter is being reciprocated in performing a cutting operation.

Another object is to facilitate the feeding of the saw blade through the work as the cutting operation progresses.

A further object is to accommodate saw blades of different thicknesses, and to enable work to be cut at various different angles with accuracy.

The above and other objects may be attained by employing this invention which embodies among its features a pair of vertically disposed spaced guide bars, a guide block mounted on each guide bar for vertical sliding movement thereon, and said guide blocks having aligned kerfs opening through their bottoms for receiving and guiding a saw blade as it reciprocates in a vertical plane.

Other features include a work holding clamp between the guide bars for holding a piece of work in a position to be operated upon by a saw blade reciprocating in the kerfs of a pair of guide blocks.

A still further feature of the invention embodies a stop bar slidably supported in the frame to limit the movement of a saw blade out of a pair of kerfs after it has cut through a piece of work.

In the drawings:

Figure 3 is a vertical sectional view through the device illustrated in Figure 2;

Figure 4 is a plan view of one of the carriages showing a portion thereof and one of the guide blocks in section;

Figure 5 is a perspective view of one of the guide blocks;

Figure 6 is an end view of the carriage illustrated in Figure 4;

Figure 7 is a perspective view of a stop bar which prevents a saw blade from being extracted from the kerfs;

Figure 8 is a perspective view of a modified form of the invention;

Figure 9 is a sectional view taken substantially along the line 9—9 of Figure 8;

Figure 10 is a sectional view taken substantially along the line 10—10 of Figure 9;

Figure 11 is a side view in elevation of one of the frame members of the device illustrated in Figure 8;

Figure 12 is a perspective view of one of the guide blocks used with the type of device illustrated in Figure 8, and;

Figure 13 is a perspective view of a guide block employed for producing minor cuts in the work.

Figure 1:
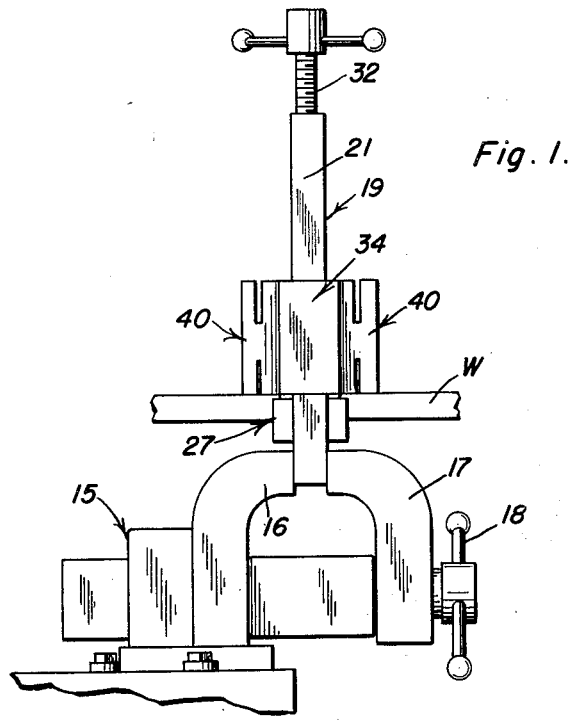
Figure 1 is an edge view of a saw guide embodying the features of this invention showing it clamped in a conventional bench vise.

Referring to the drawings in detail a conventional bench vise designated generally 15 is equipped with a stationary jaw 16 and a movable jaw 17 which is adjusted toward or away from the stationary jaw 16 by means of a conventional cross handle 18.

This improved saw guide designated generally 19 is adapted to be clamped between the jaws 16 and 17 of the vise 15, and comprises a base plate 20 from opposite ends of which rise vertically disposed spaced parallel guide bars 21. The upper ends of the guide bars are joined by a cross bar 22 which is provided intermediate its ends with an internally screw-threaded vertical opening 23, the purpose of which will be more fully hereinafter explained. Formed in the upper face of the base 20 in axial alignment with the opening 23 of the cross bar 22 is a recess 24, and extending into the base 20 in axial alignment with the recess is an internally screw-threaded opening 25 for the reception of a clamp screw 26 by means of which a work holding jaw designated generally 27 is adjustably supported in the recess 24. The jaw 27 comprises a cylindrical body 28 provided with a countersunk axial opening 29 for the reception of the screw 26, and formed in the upper exposed face of the body 28 is a V-shaped groove 30 in which the work is received. It will thus be seen that the work will be oriented with relation to the jaw 27, and that by loosening the screw 26 the jaw may be turned about the axis of the recess 24 to various angular positions therein. The body 28 is preferably provided adjacent its lower end with graduations 31 which cooperate with one end edge of the recess 24 to indicate the angle at which the longitudinal axis of the groove 30 lies with relation to the frame of the device. Extending through the internally screw threaded opening 23 in axial alignment with the jaw 27 is an externally screw-threaded stem 32 carrying at its lower end a swivelly mounted clamp jaw 33 which is adapted to cooperate with the jaw 27 in clamping a piece of work W in place in the device.

Mounted for vertical sliding movement on the guide bars 21 are carriages designated generally 34 each of which comprises a body 35 provided in one face with a groove 36 in which its respective guide bar 21 is received. A retaining plate 37 bridges the groove and serves to hold the carriage 34 in proper position on its respective guide bar for vertical movement thereon. Opposite side faces of each carriage are grooved as at 38 to form a shoulder 39 against which a guide block 40 engages.

Figure 2:
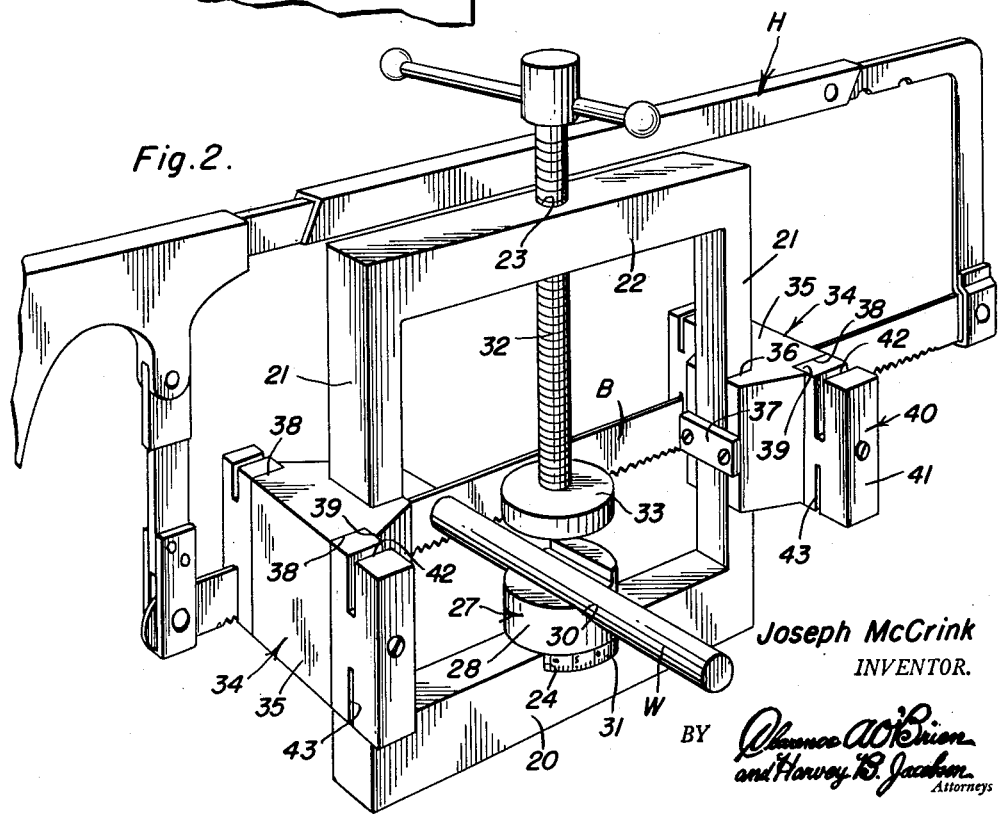
Figure 2 is an enlarged perspective view of the device illustrating a piece of work seated therein and a hack saw in operative position in the guide blocks.

Each guide block 40 comprises a rectangular body 41 preferably of hardened steel which is formed at one end with a longitudinally extending groove 42 and at its opposite end with a like groove 43. As illustrated in the drawings the grooves 42 of the guide blocks 40 are of greater width than the grooves 43 and these grooves are so arranged that those in the guide blocks carried by the carriages on opposite guide bars 21 will align with one another in a plane parallel with the opposite side faces of the base 20. The grooves 42 and 43 form kerfs in which the saw blade B of a conventional hack saw designated generally H is adapted to slide as will be readily understood upon reference to Figure 2. Since the carriages 34 are movable freely on their respective guide bars 21 it will be evident that with a saw blade B in the position illustrated in Figure 2, the blade not only will be guided through the kerfs 42 or 43 as the case may be, but when the saw blade is in the lower aligning kerfs in the guide blocks 40 the weight of the carriages and guide blocks will serve to feed the saw blade through the work as the cutting takes place. Each guide block 40 is provided intermediate its ends with a transversely extending opening 44 for the reception of a screw 45 which is adapted to enter a threaded opening 46 formed substantially midway between the upper and lower ends of the bottom walls of the grooves 38 in the carriages 34.

Extending transversely through each carriage 35 below the low ends of the guide blocks 40 is an opening 47 in which a bar 48 is mounted to slide. Each bar 48 is provided adjacent its end with a hardened roller 49 which is held in proper position thereon by means of a screw 50, and the bar is of such length that when it is slid through its opening 47 to its fullest extent, one of the rollers 49 will lie in a plane directly below the axis of the kerfs in the guide blocks 40 mounted on the carriage as will be readily understood upon reference to Figure 6.

In the modified form of the device illustrated through Figures 8 through 13 inclusive I provide a base 51 to opposite ends of which are attached as by screws 52 bifurcated arms 53 which are joined at their ends remote from the base 51 by a cross bar 54. The base 51 is provided in its upper face with a V-shaped groove 55 which extends transversely thereof, and forms a jaw member in which the work to be acted upon by the saw is supported. Formed intermediate the ends of the cross bar 54 is an internally screw threaded opening 56 in which a screw 57 is threaded, and carried at the lower end of the screw 57 is a swivelly mounted clamp jaw 58 which is adapted to cooperate with the sides of the groove 55 in holding a piece of work in place in the device.

Mounted for vertical sliding movement on the bifurcated arms 53 are guide blocks 59 which like the guide blocks 40 are provided with aligning kerfs 60, which lie in a plane perpendicular to the longitudinal axis of the groove 55, so that when a saw blade is operated through a pair of aligning kerfs 60 in the guide blocks 59, the cut in the work will lie perpendicular to the longitudinal axis thereof.

In order that a miter cut may be made, a second kerf 62 is formed in one of the guide blocks 59 while attached to the opposite guide block as by screws 63 is an arm 64 carrying at its outer end a hardened head 65 in which an angularly disposed kerf 66 which is adapted to align with the kerf 62 is formed. It will thus be seen that when a saw blade B' is introduced into the kerfs 62 and 66, the cut made thereby in the work will lie at an angle to the longitudinal axis of the work other than the perpendicular. Obviously in this type of the device the blocks 59 will serve as weights to urge the saw blade B' downwardly and into contact with the work so as to feed the saw blade as the cutting progresses. In this type of a device it is obvious that the rapidity with which the blocks 59 may descend toward the base 51 may be governed by adjusting the screws 52 to alter the distance between the legs of the bifurcated guide bars 53 and hence their frictional engagement with the guide blocks 59.

In use it will be understood that the guide blocks 40 are adjusted on their respective carriages to bring the desired kerfs 43 or 42 into alignment according to the thickness of the saw blade to be employed. The work is then clamped in the jaw 27 by means of the jaw 33, it being understood that the angular relation of the jaw 27 has been previously determined properly to orient the work with relation to the plane in which the saw blade operates. Upon lifting the carriages 34 it is obvious that the saw blade may be entered into the kerfs 42 or 43 according to the blade thickness and upon lowering the carriages it will be evident that the saw blade will be carried downwardly to engage the end of the work which projects beyond the jaw 27. Reciprocation of the saw will effect a cutting of the work with the weight of the guide blocks and carriages serving to feed the saw into the work as the cutting progresses. Owing to the relatively closely spaced positions of the guide blocks longitudinally on the saw blade it will be evident that no buckling of the saw blade can take place during its cutting operation.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A saw guide comprising a base, a work holding member rotatably mounted on the base, upstanding supporting bars mounted on the base and spaced from each other, carriages slidably mounted on the supporting bars, blocks carried by the carriages and having aligned grooves therein for receiving and guiding a saw blade and means adjustably carried by the supporting bars and complementary to the work holding member for clamping a work piece thereon.

2. A saw guide comprising a base, a work holding member rotatably mounted on the base, upstanding supporting bars mounted on the base and spaced from each other, carriages slidably mounted on the supporting bars, blocks carried by the carriages and having aligned grooves formed therein for receiving and guiding a saw blade, a cross bar connecting the upper ends of the supporting bars and a rotatable clamping member extending downwardly from the cross bar and complementary to the work holding member for clamping a work piece thereon.

3. A saw guide comprising a base, means mounted on said base for supporting a piece of work, a pair of vertically extending spaced supporting bars carried by the ends of the base, blocks slidably mounted on the bars and having aligned guide grooves for receiving and guiding a saw blade, a cross bar connecting the upper ends of the supporting bars and a clamping means adjustably extending downwardly from the cross bar and adapted to clamp a piece of work on the supporting means therefor.

4. A saw guide comprising a base, means mounted on said base for supporting a piece of work, a pair of vertically extending spaced supporting bars carried by the ends of the base, blocks slidably mounted on the bars and having aligned guide grooves for receiving and guiding a saw blade, a cross bar connecting the upper ends of the supporting bars and a clamping means adjustably extending downwardly from the cross bar and adapted to clamp a piece of work on the supporting means therefor, and rods disposed transversely through the blocks and having extending bearing ends for slidably supporting a saw blade.

5. A saw guide comprising a base, means mounted on said base for supporting a piece of work, opposed supporting bars extending upwardly from the opposed ends of the base, carriages slidably mounted on the supporting bars, guide blocks detachably and adjustably carried by the carriages and having aligned grooves formed therein for receiving and guiding a saw blade, a vertically movable clamping member carried by the supporting bars and disposed complementary to the work supporting means.

JOSEPH McCRINK.

REFERENCES CITED

The following references are of record in the file of this patent:

UNITED STATES PATENTS

| Number | Name | Date |
|---|---|---|
| 112,156 | Lombard | Feb. 28, 1871 |
| 627,183 | Goodell et al. | June 20, 1899 |
| 653,122 | Shonle | July 3, 1900 |
| 703,085 | Prentice | June 24, 1902 |
| 1,839,647 | Combs | Jan. 5, 1932 |
| 2,441,379 | Zimmermann | May 11, 1948 |